United States Patent
Menon et al.

(10) Patent No.: US 6,827,400 B2
(45) Date of Patent: Dec. 7, 2004

(54) SLEEPING OCCUPANT PROTECTION SYSTEM FOR VEHICLES

(75) Inventors: Rajiv Menon, Wallingford, PA (US); Kristy Bittenbender Arbogast, Media, PA (US); Flaura Koplin Winston, Narberth, PA (US); Kurt A. Schwinghammer, Yardley, PA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 0 days.

(21) Appl. No.: 10/445,476

(22) Filed: May 22, 2003

(65) Prior Publication Data

US 2004/0032154 A1 Feb. 19, 2004

Related U.S. Application Data (60) Provisional application No. 60/382,553, filed on May 22, 2002, and provisional application No. 60/382,636, filed on May 22, 2002.

(51) Int. Cl.[7] ................................................. A47D 1/10
(52) U.S. Cl. ..................... 297/250.1; 297/253; 297/236; 297/238
(58) Field of Search .............................. 297/250.1, 391, 297/397, 253, 236, 238

(56) References Cited

U.S. PATENT DOCUMENTS

| | | |
|---|---|---|
| 1,379,316 A | 5/1921 | Smith et al. |
| 3,014,761 A | 12/1961 | Otto |
| 3,325,213 A | 6/1967 | Levy |
| 3,992,056 A | 11/1976 | Koziatek et al. |
| 4,311,339 A | 1/1982 | Heath |
| 4,565,405 A | 1/1986 | Mayer |
| 4,596,420 A | 6/1986 | Vaidya |
| 4,904,021 A | 2/1990 | Clemmer |
| 5,385,387 A | 1/1995 | Kain |
| 5,466,044 A | 11/1995 | Barley et al. |
| 5,516,194 A | 5/1996 | Maule |
| 5,518,293 A | 5/1996 | Coy et al. |
| 5,551,749 A | 9/1996 | Reher et al. |
| 5,707,106 A | 1/1998 | Clark |
| 5,829,834 A | 11/1998 | Silverman |
| 5,954,397 A | 9/1999 | Czernakowski et al. |
| 6,000,753 A | 12/1999 | Cone, II |
| 6,007,156 A | 12/1999 | Chang |
| 6,142,565 A | 11/2000 | Rieder |
| 6,183,044 B1 | 2/2001 | Koyanagi et al. |
| 6,193,312 B1 | 2/2001 | Yoshida et al. |
| 6,199,949 B1 | 3/2001 | DaSilva |

OTHER PUBLICATIONS

Flaura K. Winston, M.D., Ph.D. & Dennis R. Durbin, M.D., M.S.C.E., "Buckle Up! Is Not Enough", Journal of the American Medical Association, 281:2070–2072 (Jun. 9, 1999).

International Search Report dated Oct. 31, 2003.

*Primary Examiner*—Milton Nelson, Jr.
(74) *Attorney, Agent, or Firm*—Caesar, Rivise, Bernstein, Cohen & Pokotilow, Ltd.

(57) ABSTRACT

A comfort system for use at middle seat of a vehicle having a pair of seats laterally on either side of the middle seat, with each lateral seat including a conventional seat belt, a backrest and a support surface. The comfort system comprises a base section having a pair of sides, an upwardly directed section having a pair of padded sides, and a pair of padded headrests located on respective sides of the upwardly directed section. With this arrangement when an occupant, e.g., a child, is seated on either lateral seat and wearing the seat belt the child may comfortably lean against the comfort system so that the occupant's head engages the headrest on the adjacent to side and at least a portion of the occupant's upper torso engages that side of the upwardly directed section.

25 Claims, 7 Drawing Sheets

SLEEPING OCCUPANT PROTECTION SYSTEM FOR VEHICLES

CROSS-REFERENCE TO RELATED APPLICATIONS

This application claims priority from provisional U.S. Patent Application Nos. 60/382,553, filed on May 22, 2002 and 60/382,636, filed on May 22, 2002.

BACKGROUND OF THE INVENTION

1. Field of Invention

The invention relates generally to vehicular safety devices and more particularly to a system for use in a vehicle that allows an occupant, e.g., a child, to comfortably sleep in a semi-erect or upright position while wearing conventional lap and shoulder safety belts.

2. Description of Related Art

According to the National Transportation Safety Board, motor vehicle crashes (MVCs) remain the leading cause of death in our nation, killing about 33 children ten years and under every week. Research has shown that serious injuries and fatalities can be prevented in MVCs with proper use of seat belts and child restraint devices. For example, according to the National Highway Traffic Safety Administration (NHTSA) U.S. Department of Transportation, child restraints have been shown to be 69 percent effective in reducing the risk of death to infants and 47 percent effective for children between the ages of one and four. Lap and shoulder belts reduce the risk of fatal injury by 45 percent and moderate to critical injury by 50 percent for passenger vehicle occupants who are older than 5 years. However, these restraint systems were developed using crash dummies that sit in perfectly upright positions. In the real world vehicle environment, passengers do not always sit facing forward and upright. It is inevitable that children will fall asleep in vehicles, especially on long car trips. Consequently, current restraint systems make sleeping very difficult and uncomfortable.

In addition, improper positioning of the seat belt compromises the effectiveness of the restraint system. If the shoulder strap is only used, a child can still slide out from under it and suffer head and neck injuries, while the lap belt alone would not protect the upper torso. Also a lap belt may ride up above the hips of a child, which may intrude into the soft abdomen and lacerate internal organs, as described in Winston, F., Durbin, D., "Buckle Up! Is Not Enough. Enhancing Protection of the Restrained Child," Journal of the American Medical Association. 281:2070–2072 (1999). A poorly fitting seat belt can cause injury during impact because the crash-energy could be transferred to the body.

Various patents disclose vehicular safety systems for holding children in a seat structure to protect them. In particular, in U.S. Pat. No. 3,014,761 (Otto) there is disclosed a device having a resilient cushion including a horizontally disposed portion and a vertically disposed portion for disposition on the horizontal support surface of a vehicle's seat and on the backrest of that seat, respectively. The device also includes a head rest.

In U.S. Pat. No. 3,325,213 (Levy) there is disclosed a one-piece cushioned chair having plural restraint straps for holding the child on the chair. The chair is itself arranged to be held onto the seat of a vehicle by means of the vehicle's seat belts.

In U.S. Pat. No. 3,992,056 (Koziatek et al.) there is disclosed a car seat for use in an automobile having a lap belt. The seat comprises an integral double wall molded shell and a restraint harness for holding a child in the seat. Slots are provided through a portion of the shell to accept the automobile lap belt to secure the seat onto automobile's seat.

In U.S. Pat. No. 4,311,339 (Heath) there is disclosed a container, for carrying an infant in a supine position, having an open top which is covered by a flexible cover of resilient perforate material, provided with seat belt retention means such that it can be retained to the rear seat of a vehicle having seat belts therein, and in the event of vehicle impact, an infant is supported over a large area of its body.

In U.S. Pat. No. 5,385,387 (Kain) there is disclosed a child carrier having a seat which may be attached and removed from a base. The base has a spring-loaded locking mechanism that automatically secures the seat in the base. The base and seat comprise an infant car seat.

In U.S. Pat. No. 5,466,044 (Barley et al.) there is disclosed a child safety seat for use in a vehicle, comprising a seat body, and two S-shaped coupling arms, each of which is pivotally mounted at one end to the seat body below the front thereof and has a front releasable fastener on its other end for attachment to a front anchorage unit located below the front edge of a vehicle seat.

In U.S. Pat. No. 5,518,293 (Coy et al.) there is disclosed a car seat for holding two children side-by-side. The car seat has a vertical divider to divide the seat into a first side and a second side, each having a seat cushion and a back cushion and a harness strap arrangement. The car seat is arranged to be located on a conventional seat in the vehicle.

In U.S. Pat. No. 5,551,749 (Reher et al.) there is disclosed an infant support seat and cushion having an inner support structure including a backrest and seat and base support member and having a removable cushion assembly. The cushion assembly has a back cushion section, a seat cushion section and a pair of side support sections. An outer cover is attached to the cushion assembly and has a release mechanism to permit the insertion and removal of the inner support structure relative to the cushion assembly. A crotch support strap and detachable belt sections hold the infant in the cushion assembly in use.

In U.S. Pat. No. 5,707,106 (Clark) there is disclosed a combination car seat and stroller which includes a carrier portion having a U-shaped handle with free ends thereof pivotally secured to a pair of side portions thereof. Each of the pair of side walls have slots formed therethrough to receive a car seat belt therethrough for securement of the carrier portion within a car. A collapsible stroller portion is dimensioned to receive the carrier portion thereon.

In U.S. Pat. No. 5,954,397 (Czernakowski et al.) there is disclosed a child safety seat is adapted to rest on a vehicle seat and to be secured thereon by a vehicle seat belt. A traveler is provided which can be coupled to a tongue of a vehicle seat belt and then moved from one side of the child seat through the opening to the other side of the child seat so as to pull the seat belt through the opening to secure it on the vehicle's seat.

In U.S. Pat. No. 6,000,753 (Cone, II) there is disclosed an apparatus for supporting a child car seat on a vehicle seat having a seat belt. The apparatus includes a seat foundation that is adapted to lie upon the vehicle seat. The seat foundation includes a base with an upper surface that is adapted to receive the child car seat thereon, side walls that extend away from the upper surface, and a seatbelt mounting catch, which is positioned to lie in the upper surface in a location between the side walls. In addition, the seat foundation includes an auxiliary belt coupled to the base. The auxiliary belt is adapted to cooperate with the base to couple the child car seat upon the seat foundation.

In U.S. Pat. No. 6,007,156 (Chang) there is disclosed apparatus for helping a user rest and sleep while in a vertical sitting position on a seat by providing vertical and horizontal support to the user's upper body and head. The apparatus is in the form of a vest that comprises one or more braces with flexible structure adapted to the user's armpits, a portion of his/her upper body, his/her head, and a supporting frame being integral with a seat. Fastening means adjustable to the user's height and size are provided. The braces, supporting frame and fastening means in combination continuously support the seated user's upper body and head vertically and horizontally, to help him/her sleep in the vertical sitting position on a seat.

In U.S. Pat. No. 6,142,565 (Rieder) there is disclosed a chair liner which can be used with car seats and which includes a back panel extending from a bottom edge to about head height of an infant, and two relatively thick arms projecting from the back panel to a front edge. The back panel preferably has a curbed top edge and the arms gradually taper inwardly from the back panel to the front edge. The arms and the back panel are of a one-piece construction. The liner has a washable fabric covering held on by a zipper that is easily opened to allow removal of the cover. The cover is machine washable and easily reinstalled.

In U.S. Pat. No. 6,183,044 (Koyanagi et al.) there is disclosed a child seat formed of a main portion for holding a child having an engaging member, and a base on which the main portion is detachably mounted. The base has a connecting portion to be connected to a vehicle, and a fixing member to be engageable with the engaging member of the main portion. The base can be connected to the vehicle without the child seat main portion.

In U.S. Pat. No. 6,193,312 (Yoshida et al.) there is disclosed a seating board which includes a board portion having a first surface on which an infant is to be seated, and a second surface on which a larger child is to be seated. The second surface is located on a side opposite to the first surface. Clamp arms are attached to the board portion for attaching the seating board to a seat portion of a child seat. When the seating board is detached from the child seat, the child seat is suitable for a child larger than the infant.

In U.S. Pat. No. 6,199,949 (DaSilva) there is disclosed a child safety seat having a child seat hingedly mounted on a seat support for use in a vehicle. The child seat includes a seat portion and a back portion with interconnecting sides, pivotally mounted on a seat support, whereby the child seat can be pivoted in either clockwise or counterclockwise direction relative to the seat support. The arrangement is such that with the seat support centrally positioned on the rear seat of a vehicle, the child seat can be pivoted so that it is positioned adjacent to and facing the door opening of the vehicle to provide for maximum ease in placing a child in the child seat. The child seat also includes a harness to hold the child in place.

All references cited herein are incorporated herein by reference in their entireties.

While the devices and systems disclosed in the aforementioned patents appear generally suitable for their intended purposes, they leave much to be desired from the standpoint of enabling children of seatbelt age or adults to sleep comfortably in vehicles, while protecting them from being seriously injured in the event of a crash. It is to this end that the subject invention is directed.

BRIEF SUMMARY OF THE INVENTION

In accordance with this invention, there is provided a comfort system for use in a motor vehicle having a conventional seat belt and a first seat including a backrest and a support surface. The comfort system is arranged to provide head, neck and upper torso support for an occupant, e.g., a child, to comfortably lean against while wearing the seat belt and sitting semi-erect on the support surface and against the backrest of the first seat. The comfort system is arranged to be located adjacent to and laterally of the first seat and comprises a base section, an upwardly directed section, and a first headrest The base section extends outward in a direction generally parallel to the support surface and has a first padded side. The upwardly directed section extends generally parallel to the backrest and has a first padded side and a top end. The first padded side of the base section and the first padded side of the upwardly directed section are located on the same side of the system and laterally adjacent to the first seat. The first headrest comprises a padded member located on the first side of the upwardly directed section adjacent to the top end thereof and projects outward from the first side.

With this arrangement when the occupant, e.g., child, is seated on the first seat and wearing the seat belt the occupant may comfortably lean against the comfort system so that the occupant's head engages the first headrest and at least a portion of the occupant's upper torso engages the first side of the upwardly directed section.

In accordance with one preferred embodiment of the invention the comfort system comprises a unit that is arranged to be releasably mounted to the vehicle laterally of the seat, e.g., to be releasably secured by means of the conventional LATCH system. Moreover, that unit has two sides, each of which is padded and constructed like the other so that the unit can be mounted in the middle seat of the vehicle between to laterally located seats, whereupon a occupant can be seated on either of those laterally located seats wearing a seat belt and leaning against the side of the unit.

In accordance with one preferred embodiment of the invention the comfort system the vehicle includes a middle seat having a backrest and a support surface, with the middle seat being located laterally adjacent to the first seat. In this embodiment the system forms a portion of the middle seat of the vehicle, e.g., is built into the middle seat with the upwardly directed section being built into and extendable from the backrest of the middle seat, and with the base section being built into and extendable from the support surface of the middle seat.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
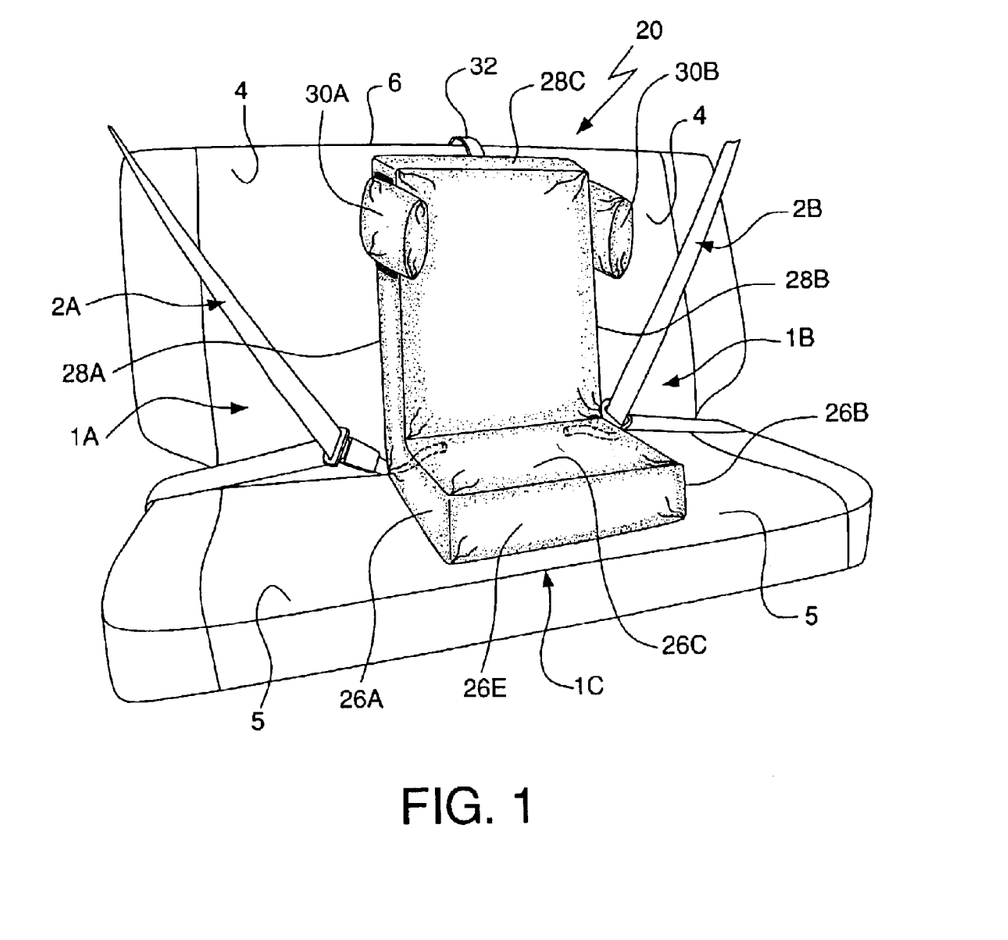
FIG. 1 is an isometric view of one exemplary embodiment, e.g., a removable unit, constructed in accordance with this invention shown mounted in place on the middle seat of a conventional bench seat of a vehicle.

Referring now to the various figures of the drawing wherein like reference characters refer to like parts, there is shown in FIG. 1 one exemplary embodiment of a comfort system 20 of this invention. The system 20 is arranged for use adjacent to at least one seat 1A in a motor vehicle (not shown) to enable any individual occupant 10 (FIG. 5) of suitable age and size to use the vehicle's seat belts, e.g., a child of between 60 and 100 pounds, to sit in the seat 1A. When seated the occupant can lean against the system 20 to sleep comfortably in a generally upright or semi-erect position while being protected by the vehicle's lap and shoulder safety belt 2A. Before describing the details of the system 20 a brief description of the vehicle's conventional seats is in order. To that end as can be seen in FIG. 1, the vehicle seat is a bench-type having three seats 1A, 1B and 1C, each provided with a seat belt. Each of the seats 1A, 1B and 1C includes a backrest portion 4 and a support surface 5. It is on the support surface 5 of the seat that an occupant of the vehicle sits, with his/her back against the backrest portion 4. Each seat also includes a top end 6 on which a head restraint (not shown) may be provided.

In the embodiment shown in FIG. 1 the comfort system 20 is a self contained unit which is arranged to be releasably secured onto the middle seat 1C of a bench seat of the vehicle, e.g., the rear bench seat, so that it is located between the heretofore identified outboard seats 1A and 1B. Seat 1B is located on the opposite side of the vehicle from seat 1A. The seat 1B is also equipped with a passive restraint system, e.g., lap and shoulder safety belt 2B. With such an arrangement a person 10 can sit on either seat 1A or 1B and lean against the side of the system 20 to sleep or otherwise relax, while wearing the seat belts of that seat in a manner that will not adversely affect the effectiveness of those restraints.

Figure 2A:
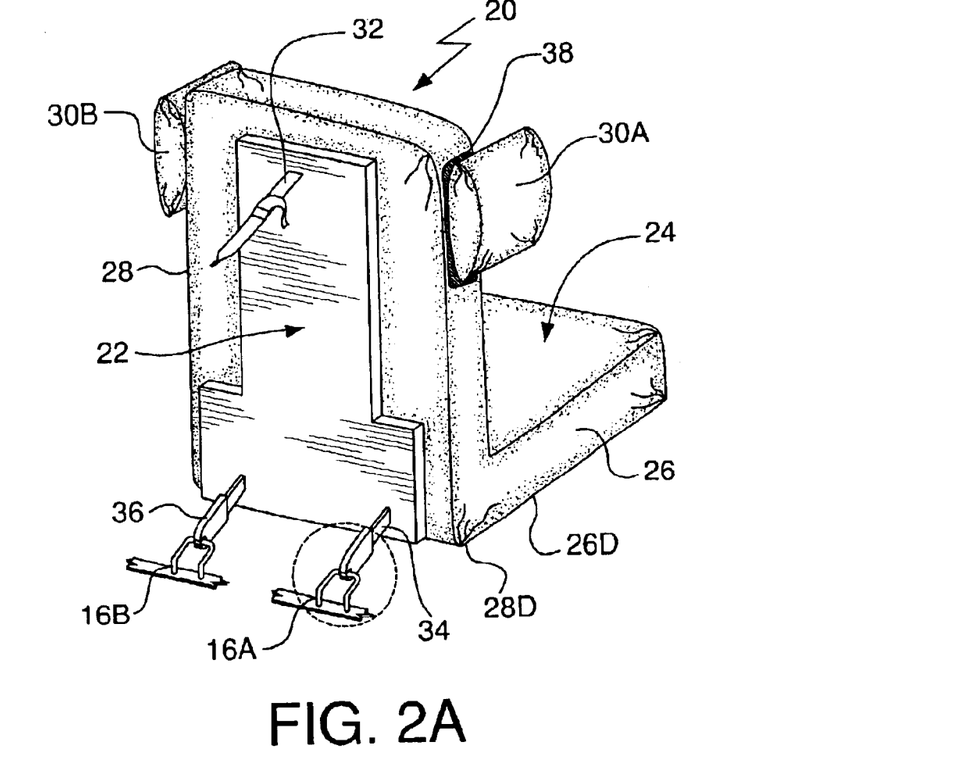
FIG. 2A is an isometric view of the rear of the unit shown in FIG. 1.
Figure 2B:
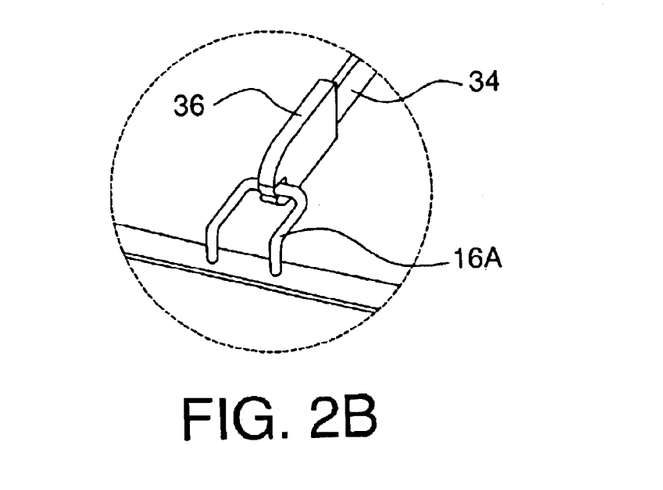
FIG. 2B is an enlarged isometric view of a conventional connector forming a portion of the unit of FIG. 1, shown connected to a hook of a conventional LATCH fastening system of the vehicle.

In accordance with a preferred aspect of this invention the unit making up the system 20 is arranged to be releasably secured to the vehicle's middle seat 1C using the vehicle's conventional Lower Anchor and Tethers for Children (LATCH) system (only portions of which are shown in FIGS. 2A and 2B). The details of the means for releasably securing the unit 20 to the LATCH system will be described later.

Turning now to FIGS. 1 and 2A it can be seen that the unit 20 basically comprises a mounting and support structure 22 (FIG. 2A) and a body member 24. The body member is soft and padded to enable the occupant to comfortably lean against portions of it when the system is in use (as will be explained later) and is in the form of a base section 26, an upwardly directed section 28, and a pair of padded headrests 30A and 30B. The support structure 22 is in the form of a generally planar panel formed of a strong and relatively rigid material, e.g., wood or plastic. The details of the panel 22 will be described later. Suffice it for now to state that the panel 22 serves as the means to releasably secure or mount the unit 20 on the vehicle's seat 1C. It should be pointed out at this juncture that while the system 20 is shown including the headrests 30A and 30B, their use is not mandatory. Hence they may be omitted from the system 20, if desired. In the exemplary embodiment shown in FIGS. 1 and 2 the headrests 30A and 30B are releasably securable to the upwardly directed section 28.

The body member 24 is preferably as an integral L-shaped unit, like shown. If desired it may be made of two separate bodies, with one body being the base section 26 and the other being the upwardly directed section 28, but with the bodies being coupled together to form the generally L-shape. The base section 26 basically comprises a block-like member having a pair of sides 26A and 26B (FIG. 1), a top surface 26C (FIG. 1), a bottom surface 26D (FIG. 2) and a front end surface 26E (FIG. 1). The upwardly directed section 28 also basically comprises a block-like member having a pair of sides 28A and 28B (FIG. 1). It also has a top end portion terminating in a top end surface 28C (FIG. 1) and a bottom end portion terminating in a bottom end surface 28D (FIG. 2). The sides 28A and 28B of the upwardly directed section are on the same sides of the unit 20 as the sides 26A and 26B, respectively, of the base section 26.

In accordance with one preferred aspect of this invention the body member 24 is formed of a soft, somewhat resilient material, e.g., polyurethane foam. In order to make sure that when the occupant leans against the unit 20 to sleep (as will be described later), he/she cannot lean too far, which action could compromise the effectiveness of the seat belts, the body member 24 preferably includes a generally L-shaped inner core (not shown) made up of a light weight, but less soft, structural material, e.g., Styrofoam. The core forms the center portion of the back of the upwardly directed section 28 and the center portion of the bottom of the base section 26. With such an arrangement the softer polyurethane foam of the body member forms the marginal sides 26A and 26B of the base section and the sides 28A and 28B of the upwardly directed section. It should be pointed out at this juncture that other light weight, materials can be used for the inner core. Moreover, the foam material surrounding the core may be replaced with any other type of padding. For aesthetic reasons, a fabric or some other decorative covering is preferably disposed over the body member 24 to conceal the material making up its base section 26 and upwardly directed section 28.

As best seen in FIG. 2, the panel 22 is of an inverted T-shape and is fixedly secured by any suitable means, e.g., an adhesive, to the rear surface of the upwardly directed section 28, e.g., to the L-shaped inner core of the body member 24. A tether 32 is secured to the top end of the panel 22. The tether 30 can be of any type, such the type used in a conventional infant car seat, to releasably secure it a hook (not shown) forming a portion of the vehicle's LATCH system by extending it over the top 6 of the seat 1C. The panel 22 also includes respective connectors 34 and 36 secured to respective side portions of the lower portion of the panel 22. The connectors 34 and 36 are each of the type used in a conventional infant car seat, to releasably secure them to hooks 16A and 16B, respectively, also forming a portion of the vehicle's LATCH system.

When the unit 20 is mounted in place on the middle seat 1C, the bottom surface 26D of the base section and the bottom surface of the upwardly directed section 28 are disposed on the seat's support surface 5 and the rear panel 22 is disposed against the backrest 4 of that seat.

Each of the padded sides 26A and 26B of the base section 26 is arranged to serve as lower cushion which is adjacent to the leg of the occupant of the adjacent to seat 1A or 1B, while each of the padded sides 28A and 28B of the upwardly directed section 28 is arranged to serve as an upper cushion which is adjacent to the upper torso of the occupant of the adjacent to seat 1A or 1B. The base section 26 and the upwardly directed section 28 may be formed entirely of a soft and padding material or may only be partially formed of a padding material, so long as the portions of the base section 26 and the upwardly directed section 28 contiguous with their respective sides are soft and padded.

As mentioned above, the body member 24 includes an L-shaped inner core (not shown) serving as a structural support for the padding to prevent an occupant positioned adjacent to the unit 20 from leaning "too far" over which would prevent the seat belts from working effectively. To that end the material making up the sections 26 and 28 of the body member can be selected to provide the desired amount of support and give, consistent with the size and weight of the occupant of the seat.

In an exemplary embodiment of this invention the panel 22 is of an appropriate size for use on a conventional vehicle seat, such as a middle seat of the rear bench seat of the vehicle. To that end, the panel 22 can have a width of about 12.5 inches at its widest portion and a height of about 24 inches. The narrow portion of the panel 22 can have a width of about 6 inches and a height of about 18 inches. The panel can be formed of ¼ inch thick plywood or plastic. The L-shaped body member 24 can have width, i.e., the distance from side-to-side of about 14 inches, a height of about 26 inches, a depth or thickness from the front surface of the base section 26 to the rear surface of the upwardly directed section 28 of about 18 inches, a depth or thickness of the upwardly directed section of about 9 inches and a height or thickness of the base section 26 of about 8 inches. The L-shaped inner core, i.e., the Styrofoam, can have a height of about 22 inches in the upwardly directed section 28, a depth or thickness of about 4.5 inches in the upwardly directed section 28, and a depth or thickness of about 6.5 inches in the base section 26. In such a case, the volume of the inner core is about 820 cubic inches and the volume of member 24 is about 1225 cubic inches.

As mentioned earlier each of the optional headrests 30A and 30B is a padded member. To that end each may be formed of polyurethane foam or any other suitable padding. Each headrest is also preferably covered with the same fabric covering as used on the sections 26 and 28 of the body member 24. Moreover, as discussed earlier, each headrest is arranged to be releasably secured to a respective side of the top portion of the upwardly directed section 28. To that end, each headrest includes one strip of one component of a conventional VELCRO® fastening system 38 fixedly secured thereto, while the sides 28A and 28B each have a strip of the cooperating component of the VELCRO® fastening system fixedly secured thereto adjacent to the top end of the section 28.

Figure 5:
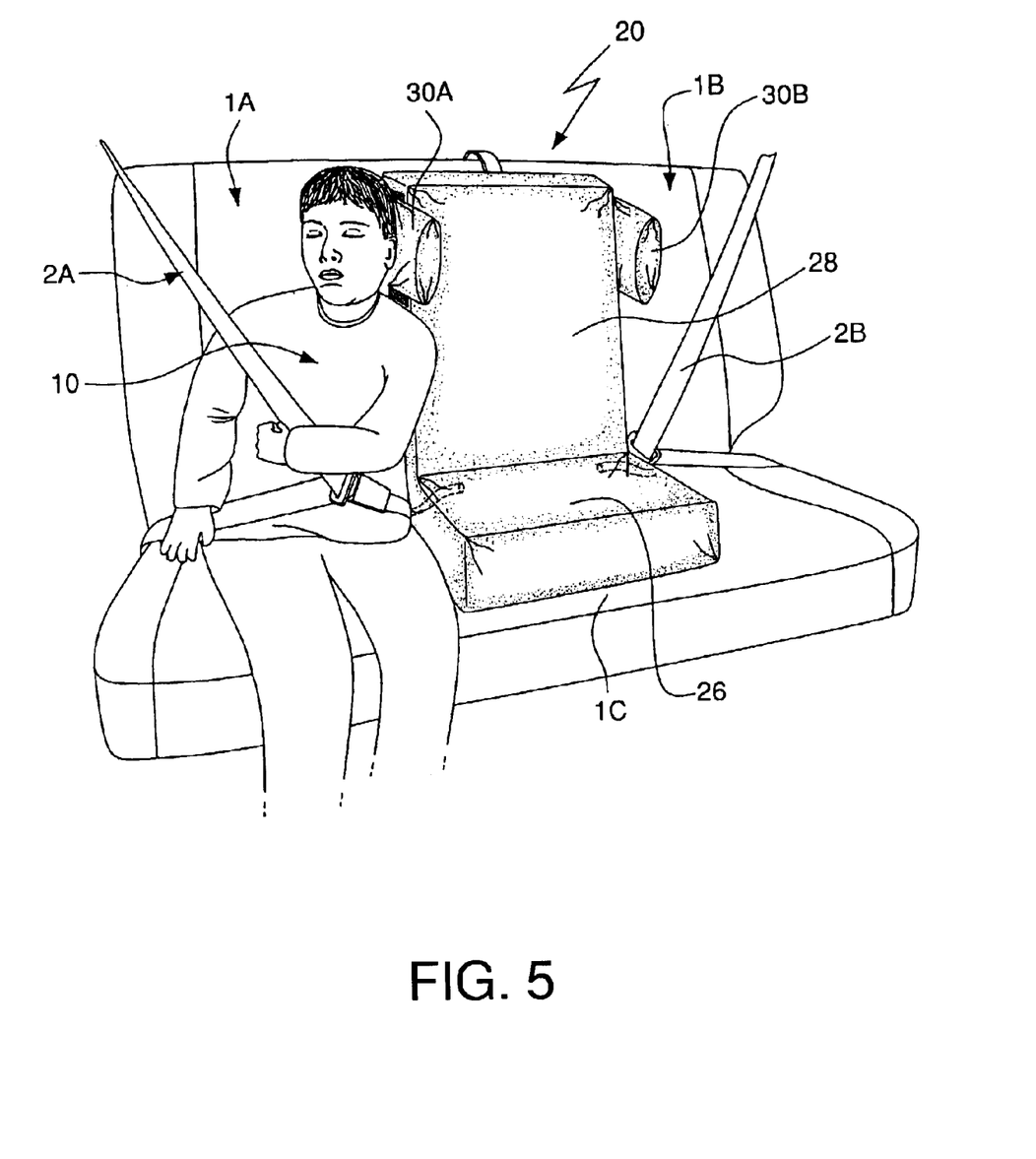
FIG. 5 is an isometric view of the embodiment of FIG. 1 showing an occupant in one of the seats of the vehicle making use of the subject invention.

When the comfort system unit 20 is in place as shown in FIG. 1, an occupant can sit in either outboard seat 1A or 1B and lean against the adjacent to side of the unit 20, as shown in FIG. 5. Since the unit 20 has two similarly constructed sides, two occupants can be serviced by a single unit, with each occupant residing in a respective outboard seat. In any case, the occupant's head may rest on the headrest on the adjacent to side (assuming that the headrest is in place) or on the side of the upper end of the upwardly directed section (if no headrest is in place or provided). At the same time the upper torso of the occupant can rest against the adjacent to side of the upwardly directed section. In addition, his/her leg may rest against the contiguous side of the base section 26. All of this can be accomplished with the occupant remaining generally erect or semi-erect, so that the lap and shoulder seat belt seat can perform its intended functions without compromise in the event that it should be called upon to protect the occupant.

As should be appreciated by those skilled in the art, a unit constructed as described above is relatively compact is size and light in weight so that it can be readily lifted by one person to place it in position and secure it on the vehicle's seat. Moreover, it can be readily removed by one person from the seat when its use is no longer desired. To achieve that end, all that is required is to disconnect the connectors from the LATCH system hooks and then lift the unit 20 off of the seat 1C.

Figure 3A:
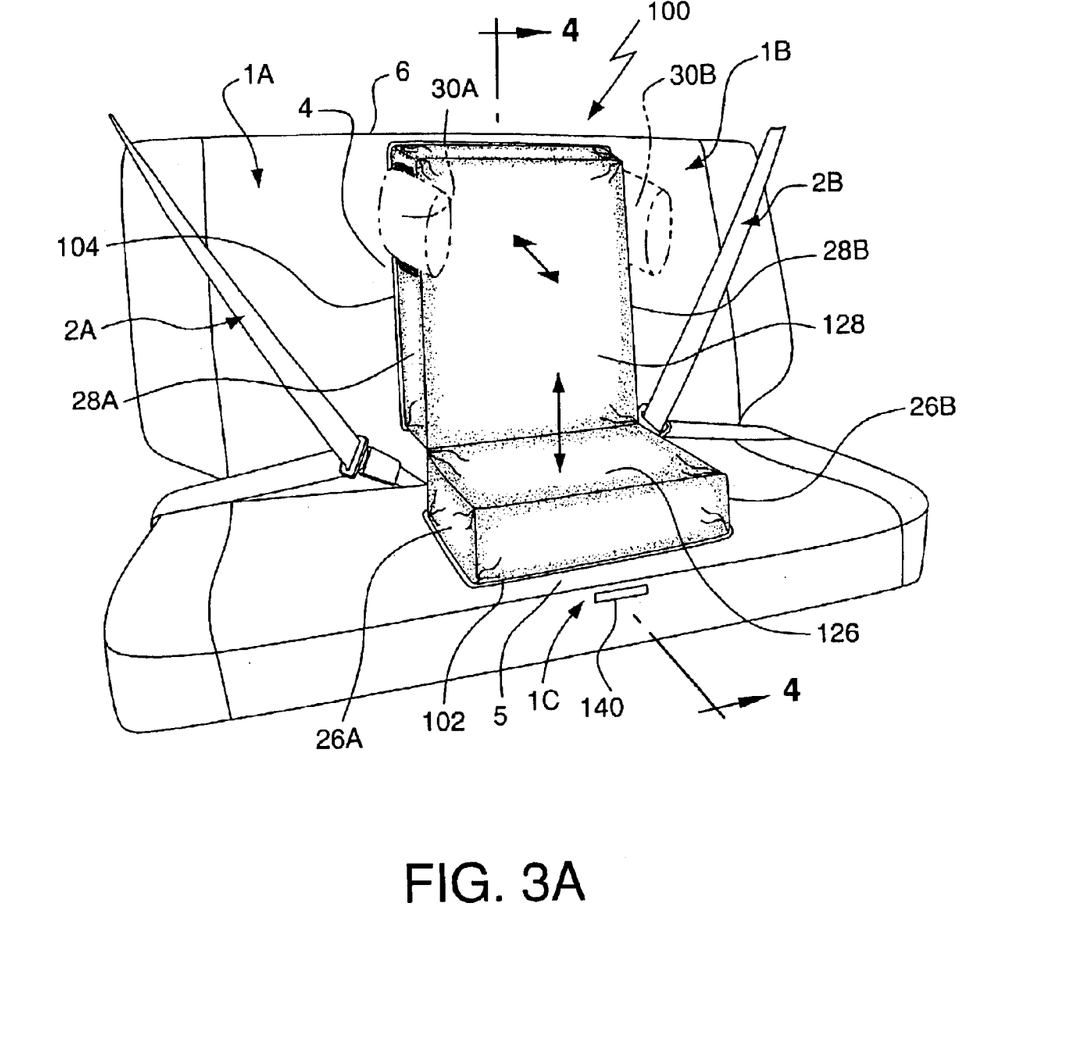
FIG. 3A is an isometric view of another exemplary embodiment, e.g., a built-in system located within the middle seat of the rear seat of a vehicle, constructed in accordance with this invention.

Turning now to FIG. 3, there is shown a built-in embodiment of a comfort system constructed in accordance with this invention. That embodiment is designated by the reference number 100 and basically comprises a base section 126 and an upwardly directed section 128. The sections 126 and 128 will be described shortly. Suffice it for now to state that each section is located within a respective portion of the middle seat 1C of the vehicle so that it can be fully retracted therein, i.e., its outer surface is flush with the outer surface of the portion of the vehicle's seat in which it is located, and when desired can be extended outward, so as to provide a similar support function as that provided by the system 20. In the interests of brevity the common components of the systems 100 and 20 will be given the same reference numbers and the components of the vehicle, i.e., its seats, restraint systems, and LATCH system will be given the same reference number as given earlier. Moreover, the details of the construction and operation of such common components will not be reiterated.

As can be seen in FIG. 3A the base section 126 basically comprise a block-like body having a pair of sides 26A and 26B, a top surface like surface 26C described earlier and a bottom surface like 26D described earlier. The upwardly directed section 28 of the unit 100 also basically comprises a block-like body having a pair of sides 28A and 28B. It also has a top end portion like portion 28C described earlier, a bottom end portion like portion 28D described earlier and a front end portion. The sides 28A and 28B of the upwardly directed section 128 are on the same sides of the unit 100 as the sides 26A and 26B, respectively, of the base section 126. Unlike the exemplary embodiment 20 shown in FIG. 1, the embodiment of the system 100 makes use of two separate sections that are not secured together. In particular, the base section 126 is a separate body located within a correspondingly shaped recess or cavity 102 in the seating surface 5 of the middle seat 1C. In a similar manner the upwardly directed section is a separate body located within a correspondingly shaped recess or cavity 104 in the backrest 4 of the middle seat 1C. The base section 126 and the upwardly directed section 128 are arranged to be held in a retracted position (not shown) when the system 100 is not in use. In the retracted position the top surface of the base section is flush with the surrounding portion of the surface 5 of the seat 1C and the front surface of the upwardly directed section is flush with the surrounding portion of the surface of the backrest 4 of the seat.

When the system 100 is not to be used the base section 126 and the upwardly directed section 128 can be retracted into their respective cavities. This arrangement enables the vehicle's seat 1C to be used for normal purposes, i.e., to enable a person to sit on it. Since, the base section 126 and the upwardly directed section 128 are located within the seating support surface 5 and the backrest 4, respectively, they are preferably formed of suitable materials to serve as conventional vehicle seats, i.e., the base section will comfortably support a person sitting on it while the upwardly directed section will comfortably support a person seated against it. Moreover, in the interests of aesthetics and concealability, each section 126 and 128 is preferably covered with the same material as that used to form the cover for the vehicle's outboard seats 1A and 1B. The sides 26A and 26B of the section 126 and the sides 28A and 28B of the section 128 are padded by means of any suitable material, to form a comfortable surface against which the occupant of the adjacent to seat may lean when the system 100 is in use.

Figure 4:
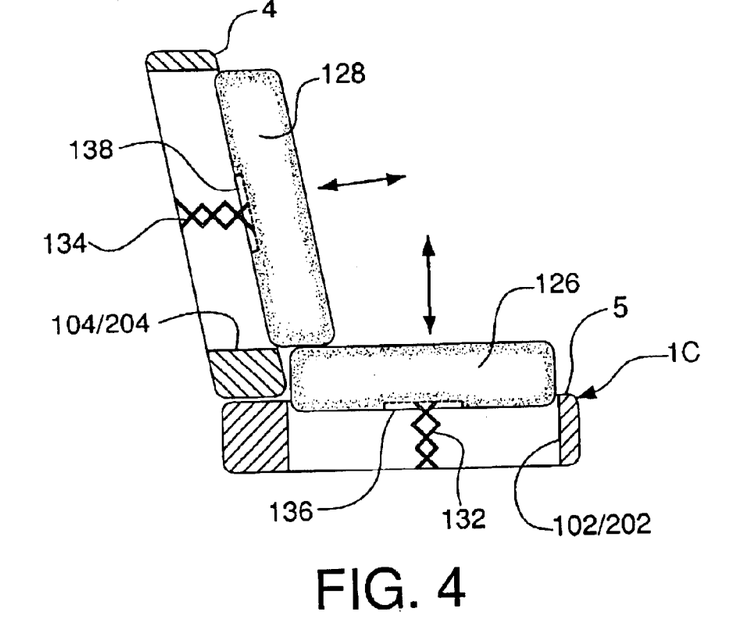
FIG. 4 is a sectional view taken along line 4—4 of FIGS. 3A and 3B.
Figure 4A:
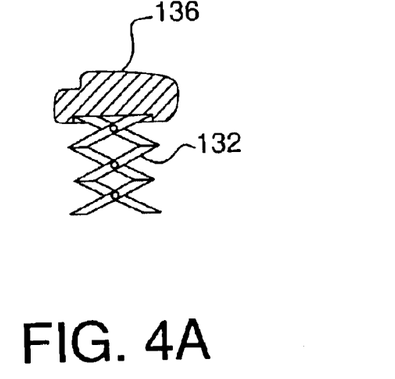
FIG. 4A is an enlarged sectional view of a portion of the system shown in FIG. 4, with the base section shown in its retracted position.
Figure 4B:
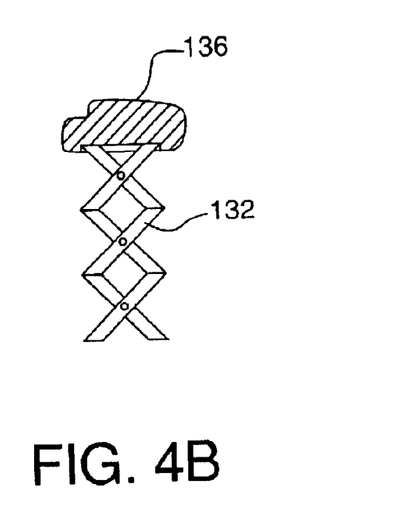
FIG. 4B is an enlarged sectional view of a portion of the system shown in FIG. 4, with the base section shown in its extended position.

If desired, the system 100 may include a pair of optional headrests 30A and 30B. If such headrests are used the cavity 104 will be appropriately shaped to accommodate them. In FIG. 3A the system 100 is shown in its orientation ready for use by a person sitting in either seat 1A or 1B or by one person sitting in seat 1A and another person sitting in seat 1B. In order to enable the sections 126 and 128 to be extended from their retracted position to the extended position and vice versa, each of the sections is mounted on a extender/retractor device. In this embodiment, as seen in FIGS. 4, 4A and 4B, the extender/retractor for the sections 126 and 128 basically comprises a pair of pantographs 132 and 134, respectively. In particular, one end of the pantograph 132 is fixedly secured to a structural portion of the vehicle's seat or the vehicle chassis, while the other or free end of the pantograph 130 is secured at 136 to the undersurface of the base section 126 (see FIG. 4). In a similar manner, one end of the pantograph 134 is fixedly secured to a structural portion of the vehicle's seat or the vehicle chassis, while the other or free end of the pantograph 134 is secured at 138 to the undersurface of the upwardly directed section 128 (see FIG. 4). Each pantograph is spring biased so that it will tend to elongate from a contracted state, such as shown in FIG. 4A, to an elongated state, such as shown in FIG. 4B. When the pantograph 132 is in the contracted state, the base section 126 is in its retracted state so that its top surface is flush with seating surface 5 of seat 1C. When the pantograph 132 is in its elongated state, the base section 126 is in the extended state as shown in FIGS. 3A, 4 and 4B. In a similar manner, when the pantograph 134 is in the contracted state, the upwardly directed section 128 is in its retracted state so that its front surface is flush with backrest surface 4 of seat 1C. When the pantograph 134 is in its elongated state, the upwardly directed section 128 is in the extended state as shown in FIGS. 3A and 4.

In order to control the action of the pantographs 132 and 134, the system 100 preferably includes one or more manually operated actuators 140. The actuator(s) 140 may comprise a button or lever mounted on the seat 1C or adjacent to the seat, and is(are) operative, when actuated to enable the pantographs to move from their contracted state to their elongated state, thereby resulting in the extension of the base section and the upwardly directed section from the seat 1C. These sections may be returned to their retracted states by merely pressing upon them or by sitting on them.

While the extender/retractors are shown as being pantographs, such an arrangement is merely exemplary. Thus, any spring biased device or any other moving device, e.g., a solenoid, an electric motor, etc., can be utilized to effect the extension and/or retraction of the base section and upwardly directed section from the seat 1C.

Figure 3B:
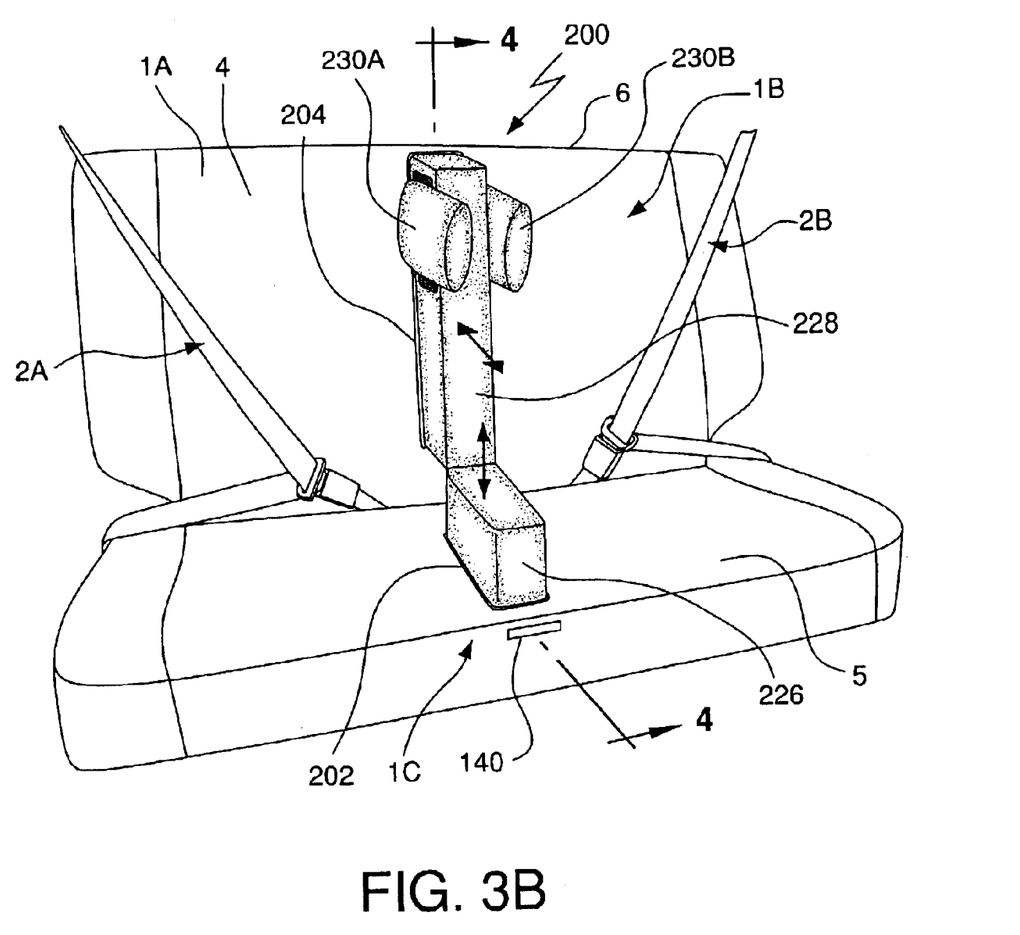
FIG. 3B is an isometric view, similar to FIG. 3A, but showing another exemplary built-in system constructed in accordance with this invention.

In FIG. 3B there is shown an alternative built-in embodiment of the comfort system of this invention. That system is designated by the reference number 200 and is similar in construction to the system 100. Thus, in the interests of brevity the common components of the systems 100 and 200 will be given the same reference numbers and the components of the vehicle, i.e., its seats, restraint systems, and LATCH system will be given the same reference number as given earlier. Moreover, the details of the construction and operation of such common components will not be reiterated.

The system 200 basically comprises a base section 226 and an upwardly directed section 228. The sections 226 and 228 are similar to sections 126 and 128, except that they are narrower in width, i.e., they are elongated members. The section 228 preferably includes headrests 230A and 230B located on respective sides 28A and 28B of the section at the top end thereof, but the use of such headrests is not mandatory. Each headrest projects outward from the top end of the upwardly directed section so that it will be located adjacent to the head of a person seated in the adjacent to seat. This ensures that the person sitting in that seat doesn't have to lean too far over to rest his/her head on the system, since leaning too far over could interfere with the effectiveness of the seat belt. If headrests are utilized each is preferably formed of a padding material, and is also covered with the same fabric or covering as used in the sections 226 and 228.

The sections 226 and 228 are located within respective correspondingly shaped recess or cavity portions 202 and 204 of the middle seat 1C of the vehicle so that they are fully retracted therein, i.e., the outer surface of each is flush with the outer surface of the portion of the vehicle's seat in which it is located. Each section is arranged to be extended outward, so as to provide a similar support function as that provided by the systems 20 and 100. When the system 200 includes the headrests 230A and 230B, each of the recesses 202 and 204 is shaped to accommodate the headrest. The sections 226 and 228 are extended and retracted out of the seat 1C by the same means, e.g., the manually operated actuator(s) 140, and in the same manner as described with respect to built-in system embodiment 100. Moreover, the operation and use of system 200 is also the same as described with respect to system 100.

Figure 3C:
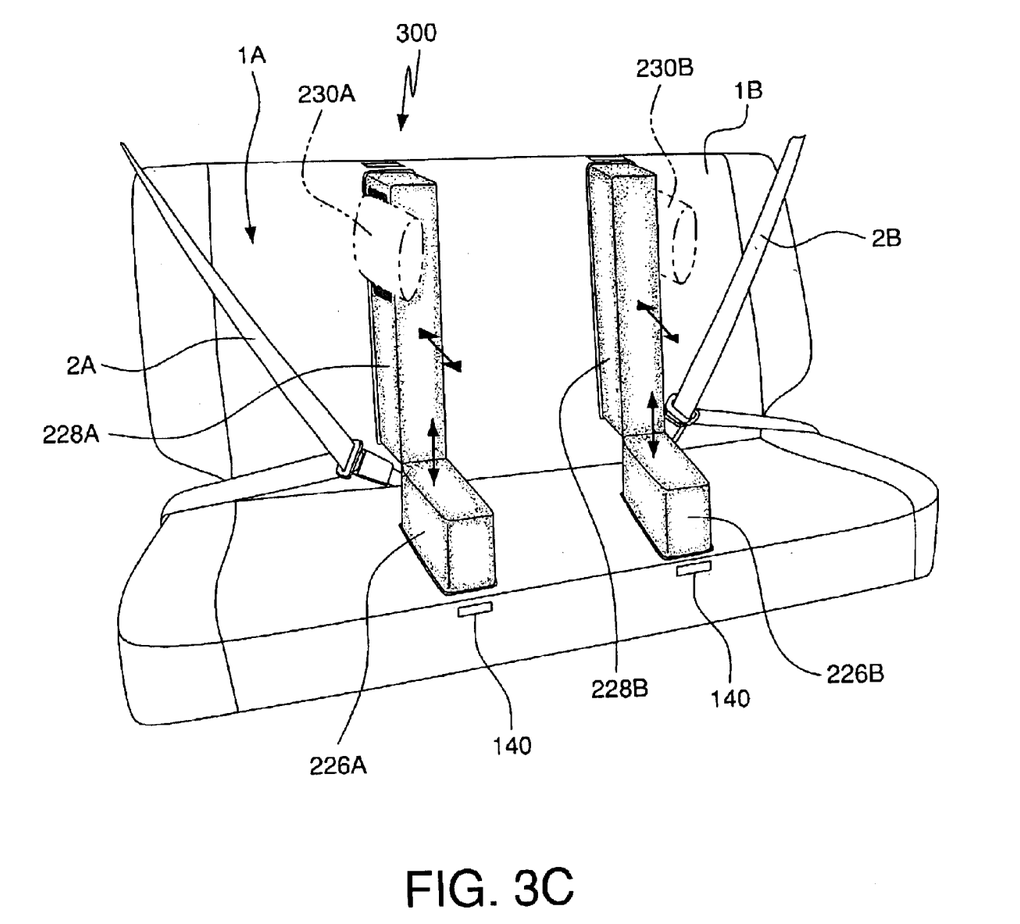
FIG. 3C is an isometric view, similar to FIGS. 3A and 3B, but showing still another exemplary built-in system constructed in accordance with this invention.

In FIG. 3C there is shown another alternative built-in embodiment of the comfort system of this invention. That system is designated by the reference number 300 and is similar in construction to the system 200, except that it includes two base sections and two upwardly extending sections, with one base section and one upwardly extending section being longitudinally aligned and disposed in seat 1C adjacent to outboard seat 1A, and with the other base section and the other upwardly extending section being longitudinally aligned and disposed in seat 1C adjacent to outboard seat 1B. In the interests of brevity the common components of the systems 200 and 300 will be given the same reference numbers and the components of the vehicle, i.e., its seats, restraint systems, and LATCH system will be given the same reference number as given earlier. Moreover, the details of the construction and operation of such common components will not be reiterated.

The system 300 basically comprises a first base section 226A, a first upwardly directed section 228A, a second base section 226B and a second upwardly directed section. The first base section 226A and the first upwardly directed section 228A are longitudinally aligned and located correspondingly shaped recesses in the seat 1C adjacent to the outboard seat 1A, while the second base section 226B and the second upwardly directed section 228B are longitudinally aligned correspondingly shaped recesses in the seat 1C adjacent to the outboard seat 1B. In this embodiment neither section 228A or 228B includes a projecting headrest, since the upwardly directed sections are themselves closely adjacent to the respective outboard seats, so that the occupant of the seat doesn't have to lean too far over to engage the side of the upwardly directed section to rest his/her head against it. If it is desired, headrests 130A and 130B can be provided as shown by the phantom lines in FIG. 3C. Each section 226A, 228A, 226B and 228B is located within a respective correspondingly shaped recess or cavity portion of the middle seat 1C of the vehicle so that it is fully retracted therein, i.e., its outer surface is flush with the outer surface of the portion of the vehicle's seat in which it is located, and is arranged to be extended outward, so as to provide a similar support function as that provided by the system 200. The sections 226A, 228A, 226B and 228B are extended and retracted out of the seat 1C by the same means and in the same manner as described with respect to built-in system embodiment 200, except that the sections 226A and 228A may be extended/retracted independently of the extension/retraction of the sections 226B and 228B. To that end one actuator 140 is preferably provided for the sections 226A and 228A and another actuator 140 is provided for the sections 226B and 228B. The operation and use of system 300 is also the same as described with respect to system 200.

As should be appreciated by those skilled in the art the comfort systems of this invention provide head, neck and upper torso support for an occupant, e.g., a child, to comfortably lean against while sitting semi-erect and without compromising the effectiveness of the vehicle's passive restraint system.

Without further elaboration the foregoing will so fully illustrate my invention that others may, by applying current or future knowledge, adopt the same for use under various conditions of service.

What is claimed is:

1. A comfort system for use in a motor vehicle having a conventional seat belt and a first seat including a backrest and a support surface, said comfort system being arranged to provide head, neck and upper torso support for an occupant to comfortably lean against while wearing the seat belt and sitting semi-erect on the support surface and against the backrest of the first seat, said comfort system being arranged to be located adjacent to and laterally of the first seat and comprising a base section, an upwardly directed section, and a first headrest, said base section being arranged to extend outward in a direction generally parallel to the support surface and having a first padded lateral side, said upwardly directed section being arranged to extend generally parallel to the backrest and having a first padded lateral side and a top end, said first padded lateral side of said base section and said first padded lateral side of said upwardly directed section being located on the same side of said comfort system and being arranged to be located laterally adjacent to the first seat, said first headrest comprising a padded member located on said first lateral side of said upwardly directed section adjacent to said top end thereof and projecting laterally outward from said first lateral side, whereupon when the occupant is seated on the first seat and wearing the seat belt the occupant may comfortably lean against said comfort system so that the occupant's head engages said first headrest and at least a portion of the occupant's upper torso engages said first side of said upwardly directed section.

2. The comfort system of claim 1 wherein said comfort system comprises a unit that is arranged to be mounted to the vehicle laterally of said first seat.

3. The comfort system of claim 2 wherein said upwardly directed section and said base section each comprise a soft material.

4. The comfort system of claim 3 additionally comprising a rear panel formed of a relatively rigid material.

5. The comfort system of claim 2 wherein said unit is arranged to be releasably securable to the vehicle.

6. The comfort system of claim 5 wherein said unit is arranged to be releasably securable to the vehicle by use of a LATCH system.

7. The comfort system of claim 4 wherein said upwardly directed section and said base section each comprise a soft material.

8. The comfort system of claim 7 additionally comprising a rear panel formed of a relatively rigid material.

9. The comfort system of claim 8 wherein said rear panel includes connectors for connecting said comfort system to a LATCH system.

10. The comfort system of claim 1 wherein the motor vehicle includes a second seat and wherein said comfort system is adapted to be located adjacent the second seat and wherein said base section includes a second padded lateral side located opposite to said first side, said upwardly directed section includes a second padded lateral side located opposite to said first side, and wherein said comfort system additionally comprises a second headrest, said second headrest comprising a padded member located on said second lateral side of said upwardly directed section adjacent to said top end thereof and projecting laterally outward from said second side, whereupon when an occupant is seated on a second seat of the vehicle located laterally adjacent to said second side may comfortably lean against said comfort system so that the occupant's head engages said second headrest and at least a portion of the occupant's upper torso engages said second side of said upwardly directed section.

11. The comfort system of claim 1 wherein the vehicle includes a middle seat having a backrest and a support surface, the middle seat being located between and laterally adjacent to the first seat and a second seat and wherein said comfort system is adapted to form a portion of the middle seat of the vehicle.

12. The comfort system of claim 11 wherein said comfort system is arranged to be built into the middle seat, with said upwardly directed section being arranged to be built into the backrest of the middle seat, and with the base section being arranged to be built into the support surface of the middle seat.

13. The comfort system of claim 12 wherein said upwardly directed section and said base section are arranged to be moved from a retracted position within the middle seat to an extended position with respect thereto, whereupon said upwardly directed section projects outward from the backrest and said base section projects upward from said support surface.

14. The comfort system of claim 13 including at least one actuator arranged for causing said upwardly directed section and said base section to move from said retracted position to said extended position.

15. The comfort system of claim 13 wherein said upwardly directed section and said base section are arranged to be moved to the retracted position when a person sits on the middle seat of the vehicle when said upwardly directed section and said base section are in the extended position.

16. The comfort system of claim 13 wherein said comfort system comprises a pair of upwardly directed sections disposed parallel to each other and a pair of base sections disposed parallel to each other, with one of said upwardly directed sections and one of said base sections being arranged to be longitudinally aligned and located adjacent to the first seat, and with the other of said upwardly directed sections and the other of said base sections being arranged to be longitudinally aligned and located adjacent to the second seat of the vehicle.

17. A comfort system for use in a motor vehicle having a conventional seat belt and a first seat including a backrest and a support surface, said comfort system being arranged to provide head, neck and upper torso support for an occupant to comfortably lean against while wearing the seat belt and sitting semi-erect on the support surface and against the backrest of the first seat, said comfort system being arranged to be located adjacent to and laterally of the first seat and comprising a base section and an upwardly directed section, said base section being arranged to extend outward in a direction generally parallel to the support surface and having a first padded side, said upwardly directed section being arranged to extend generally parallel to the backrest and having a top end and a first padded side on the same side as the first padded side of said base section, said first padded side of said upwardly directed section and said base section being arranged to be located laterally adjacent to the first seat, said upwardly directed section including a relatively rigid back panel arranged for releasably securing said system to the vehicle, whereupon when an occupant is seated on the first seat and wearing the seat belt the occupant may comfortably lean against said comfort system so that the occupant's head engages said first side of said upwardly directed section adjacent to the top end thereof and at least a portion of the occupant's upper torso engages said first side of said upwardly directed section.

18. The comfort system of claim 17 wherein said upwardly directed section and said base section each comprise a resilient material.

19. A comfort system for use in a motor vehicle having a middle seat, a first seat located laterally adjacent to the middle seat and a conventional seat belt located at the first seat, the first seat including a backrest and a support surface, the middle seat having a backrest and a support surface, said comfort system being arranged to provide head, neck and upper torso support for an occupant to comfortably lean against while wearing the seat belt and sitting semi-erect on the support surface and against the backrest of the first seat, said comfort system being arranged to be built-into the middle seat and comprising a base section and an upwardly directed section, said base section being arranged to extend outward in a direction generally parallel to the support surface of the middle seat and having a first padded side, said upwardly directed section being arranged to extend generally parallel to the backrest and having a top end and a first padded side on the same side as the first padded side of said base section, said first padded side of said upwardly directed section and said base section being arranged to be located laterally adjacent to the first seat, whereupon when an occupant is seated on the first seat and wearing the seat belt the occupant may comfortably lean against said comfort system so that the occupant's head engages said first side of said upwardly directed section adjacent to the top end thereof and at least a portion of the occupant's upper torso engages said first side of said upwardly directed section.

20. The comfort system of claim 19 wherein said upwardly directed section is arranged to be built into the backrest of the middle seat, and said base section is arranged to be built into the support surface of the middle seat.

21. The comfort system of claim 20 wherein said upwardly directed section and said base section are arranged to be moved from a retracted position within the middle seat to an extended position with respect thereto, whereupon said upwardly directed section projects outward from the backrest and said base section projects upward from said support surface.

22. The comfort system of claim 21 including at least one actuator arranged for causing said upwardly directed section and said base section to move from said retracted position to said extended position.

23. The comfort system of claim 21 wherein said upwardly directed section and said base section are arranged to be moved to the retracted position when a person sits on the middle seat of the vehicle when said upwardly directed section and said base section are in the extended position.

24. The comfort system of claim 21 wherein said comfort system comprises a pair of upwardly directed sections disposed parallel to each other and a pair of base sections disposed parallel to each other, with one of said upwardly directed sections and one of said base sections being arranged to be longitudinally aligned and located adjacent to the first seat, and with the other of said upwardly directed sections and the other of said base sections being arranged to be longitudinally aligned and located adjacent to a second seat of the vehicle.

25. The comfort system of claim 19 additionally comprising a first padded headrest located on said first side of said upwardly directed section adjacent to said top end thereof.

* * * * *